United States Patent
Lang et al.

(10) Patent No.: US 9,973,664 B2
(45) Date of Patent: May 15, 2018

(54) EXTERNAL CAMERA DEVICE THAT THERMALLY COUPLES CAMERA OPTICS TO A VEHICLE'S VENTILATION SYSTEM

(71) Applicant: Mekra Lang GmbH & Co. KG, Fuerth (DE)

(72) Inventors: Werner Lang, Ergersheim (DE); Matthias Zink, Ohrenbach (DE)

(73) Assignee: Mekra Lang GmbH & Co. KG, Ergersheim (DE)

( * ) Notice: Subject to any disclaimer, the term of this patent is extended or adjusted under 35 U.S.C. 154(b) by 1070 days.

(21) Appl. No.: 13/951,458

(22) Filed: Jul. 26, 2013

(65) Prior Publication Data

US 2014/0036079 A1 Feb. 6, 2014

(30) Foreign Application Priority Data

Aug. 3, 2012 (DE) .......................... 10 2012 213 813

(51) Int. Cl.
*H04N 5/225* (2006.01)
*B60R 1/06* (2006.01)
(Continued)

(52) U.S. Cl.
CPC ......... *H04N 5/2252* (2013.01); *B60R 1/0602* (2013.01); *B60R 11/04* (2013.01); *B60R 2001/1253* (2013.01)

(58) Field of Classification Search
None
See application file for complete search history.

(56) References Cited

U.S. PATENT DOCUMENTS

| 3,859,899 A | * | 1/1975 | Mills | ...................... B60H 1/267 |
| | | | | 359/509 |
| 5,096,287 A | * | 3/1992 | Kakinami | ................. B60R 1/12 |
| | | | | 352/131 |

(Continued)

FOREIGN PATENT DOCUMENTS

| DE | 4022085 A1 | 7/1990 |
| DE | 29504485 | 3/1995 |

(Continued)

OTHER PUBLICATIONS

Search Report of the European Patent Office in foreign related application EP13178381.3 dated Sep. 20, 2013 (6 pages).

(Continued)

*Primary Examiner* — Christopher S Kelley
*Assistant Examiner* — Kaitlin A Retallick
(74) *Attorney, Agent, or Firm* — Imperium Patent Works; Darien K. Wallace (57) ABSTRACT

An external camera device for a motor vehicle prevents condensation on the camera optics by thermally coupling the optics to an air stream from the vehicle's ventilation system. The camera optics are disposed adjacent to an optical window in a camera holder that is attached to an outer surface of the motor vehicle. A flow channel guides the air stream through the camera holder. An inlet of the flow channel is connected to the ventilation system, and the flow channel is thermally coupled to the camera optics. The device is mounted onto the vehicle through a mounting surface of the camera holder. The inlet of the flow channel passes through the mounting surface. The outlet of the flow channel can either pass through the mounting surface or exit adjacent to the optical window, in which case a fluid-guide element guides the air stream from the outlet towards the optical window.

22 Claims, 5 Drawing Sheets

(51) Int. Cl.
    *B60R 11/04*    (2006.01)
    *B60R 1/12*    (2006.01)

(56) References Cited

U.S. PATENT DOCUMENTS

| | | | | |
|---|---|---|---|---|
| 5,131,886 | A * | 7/1992 | Haustein | B60H 1/00371 454/124 |
| 5,760,828 | A * | 6/1998 | Cortes | B60R 1/00 348/143 |
| 7,645,961 | B2 | 1/2010 | Fernandez | 219/209 |
| 2002/0153750 | A1* | 10/2002 | Feith | B60H 1/00564 296/208 |
| 2006/0132940 | A1* | 6/2006 | MacDougall | B60R 1/10 359/843 |
| 2007/0006999 | A1* | 1/2007 | Lee | B60H 1/34 165/203 |
| 2008/0055411 | A1* | 3/2008 | Lee | B60R 1/00 348/148 |
| 2010/0202052 | A1 | 8/2010 | Sharma | 359/512 |
| 2011/0266375 | A1 | 11/2011 | Ono et al. | 239/589 |

FOREIGN PATENT DOCUMENTS

| | | | |
|---|---|---|---|
| DE | 19519097 | 5/1995 | |
| DE | 10329900 | 7/2003 | |
| DE | 102011017684 | 4/2011 | |
| EP | 0711681 | 6/1995 | |
| EP | 0711681 A1 | 6/1995 | |
| EP | 1626583 | 5/2003 | |
| EP | 2692586 A1 | 7/2013 | |
| JP | H03-266739 A | 3/1990 | |
| JP | 1997-504494 | 6/1995 | |
| JP | 2001-88611 A | 9/1999 | |
| JP | 2002-040554 A | 7/2000 | |
| JP | 2004-025930 A | 6/2002 | |
| JP | 2007-015457 A | 7/2005 | |
| KR | 2001-0055023 | 12/1999 | |
| WO | WO 83/04225 | 12/1983 | |
| WO | WO 8304225 A1 * | 12/1983 | B60H 1/248 |

OTHER PUBLICATIONS

Office Action from the German Patent Office dated Oct. 9, 2014 in related German application DE102012213813.7 (6 pages).
Office Action from the German Patent Office dated Mar. 8, 2012 in related German application DE102012213813.7 (7 pages).
Office action (and English translation) of Japanese Patent Office dated Sep. 9, 2014 in the foreign related application JP2013-160096 (8 pages).
Opposition dated Jun. 9, 2016 with the European Patent Office against the counterpart European application EP13178381.3 (16 pages).
English translation of Jun. 9, 2016 Opposition of L above (15 pages).
English translation of Office action of the Korean Patent Office dated Jul. 18, 2014 in the foreign related application KR10-2013-0087901 (6 pages).

\* cited by examiner

EXTERNAL CAMERA DEVICE THAT THERMALLY COUPLES CAMERA OPTICS TO A VEHICLE'S VENTILATION SYSTEM

CROSS REFERENCE TO RELATED APPLICATION

This application is based on and hereby claims the benefit under 35 U.S.C. § 119 from German Patent Application No. DE 102012213813.7, filed on Aug. 3, 2012, in the German Patent Office. This application is a continuation-in-part of German Patent Application No. DE 102012213813.7, the contents of which is incorporated herein by reference.

TECHNICAL FIELD

The present invention relates to an external camera device for vehicles, in particular motor vehicles, as well as a vehicle with such an external camera device for recording at least one legally stipulated field of view.

BACKGROUND

At present, mirrors are mainly used for inspecting the surroundings of motor vehicles. At the same time, the weather-dependent impairment of a mirror's function, for example, due to condensation or the buildup of ice on the mirror through various systems, bears consideration. In the patent documents DE 19519097 A1 and DE 29504485 U1, rearview mirror systems are proposed that free mirrors from visual impairment due to temperature and weather conditions by means of contact with warm air. For precise, legally-stipulated fields of view, however, in the near future the use of camera monitoring systems and indirect visual systems will be allowed.

Camera systems, such as are also proposed in DE 10329900 A1, for instance, have been installed inside vehicles in order to fulfill various support and surveillance functions. In addition, camera monitoring systems are already found in test vehicles, prototypes, and exhibition vehicles at shows. These vehicles already have camera monitoring systems instead of external mirrors that extend out from the vehicle and have camera arms instead of the external mirrors. It has been shown that in extreme weather conditions the functioning of these camera devices with optics and electronics is not always guaranteed. In particular, the need has been shown for the camera device to be additionally heated at low temperatures in the winter. But malfunctions can also occur during very hot weather in the summer. The use of camera systems that are designed accordingly for large ambient temperature differences have led to substantially higher costs.

It is therefore a task of this invention to disclose an external camera device as well as a vehicle equipped therewith that exhibits increased reliability without such a system being overly expensive.

SUMMARY

A camera device for vehicles, in particular motor vehicles, as well as a vehicle with such a camera device is provided for recording at least one legally stipulated field of view. In test vehicles, prototypes, and exhibition vehicles at shows, camera monitoring systems are already in use that replace outside mirrors, with camera arms extending out away from the vehicle in place of the outside mirror. It has been shown that the function of these camera devices with optics and electronics is not always guaranteed, primarily due to extreme weather conditions. The camera optics disposed in the camera holder, as well as the optical window related to the camera optics, are brought to a temperature at which no condensation problems occur using a flow channel constructed in the camera holder to guide a heat-transport fluid. The camera optics are brought to the proper temperature by the heat-transport fluid by means of thermal coupling. Water drops, frost and ice on the outside of the optical window are thereby removed. In this manner, the camera device can be connected to the air-conditioning equipment of a vehicle so that the air-conditioned air from the inside of the vehicle (the heat-transport fluid) can also flow through the flow channel in the camera holder. By means of this stream of air or heat-transport fluid, the camera optics and the optical window are brought to the temperature of the heat-transport fluid or of the stream of air from the air-conditioning system of the vehicle. Because air-conditioning systems are usually used at temperatures at which people feel comfortable and engineering equipment also functions with no problems in these temperature ranges, a simple temperature adjustment of the installed camera equipment outside the vehicle is attained in this way. Consequently, the reliability of the camera equipment increases without the camera system becoming overly expensive.

In one embodiment, an external camera device includes camera optics, a camera holder with an optical window, and a flow channel through the camera holder. The camera holder is attached to an outer surface of a motor vehicle. The camera optics are disposed in the camera holder. The optical window in the camera holder is disposed adjacent to the camera optics. The flow channel through the camera holder guides an air stream generated by the ventilation system of the motor vehicle, such as the air-conditioning system. The flow channel includes an inlet and an outlet. The inlet of the flow channel is connected to the ventilation system of the motor vehicle, and the flow channel is thermally coupled to the camera optics.

The camera holder includes a mounting surface upon which the external camera device is mounted onto the motor vehicle. The inlet of the flow channel passes through the mounting surface. In one embodiment, the outlet of the flow channel also passes through the mounting surface. In another embodiment, the outlet of the flow channel does not pass through the mounting surface but rater is disposed adjacent to the optical window. A fluid-guide element guides the air stream from the outlet towards the optical window.

The camera holder includes a first holder part and a second holder part. The inlet and outlet of the flow channel are disposed in the first holder part, and the camera optics and the optical window are disposed in the second holder part. The first holder part is constructed as the flow channel, and the second holder part is both airtight and water-tight. Heat-exchanger equipment is disposed between the two holder parts, and the heat-exchanger equipment thermally couples the second holder part to the first holder part. In one implementation, the heat-exchanger equipment is a partition with heat-exchanger fins.

In another embodiment, a motor vehicle includes a camera holder with an optical window, camera optics and a flow channel through the camera holder. The camera holder is attached to the outer surface of the motor vehicle and extends out laterally away from the motor vehicle from a location adjacent to an A-pillar of the motor vehicle. The camera optics are disposed in the camera holder. The optical window in the camera holder is disposed adjacent to the camera optics. The flow channel through the camera holder is thermally coupled to the camera optics and guides an air stream from the ventilation system of the motor vehicle. The inlet of the flow channel is connected to the ventilation system of the motor vehicle. In one implementation, the outlet of the flow channel is connected to the ventilation system of the motor vehicle. In another implementation, a fluid-guide element guides the air stream from the outlet of the flow channel towards the optical window.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In that a flow channel for a heat-transport fluid is constructed in a camera holder, the camera electronics and camera optics disposed in the camera holder, as well as the optical window associated with the camera optics, are brought to a temperature at which no condensation problems occur. Water drops, frost and ice are removed from the outside of the optical window by thermal coupling of the optical window to the camera optics, which are brought to the proper temperature by a heat-transport fluid. In this way, the camera device can be connected to the air-conditioning equipment of a vehicle so that the air-conditioned air from the inside of the vehicle can also flow through the flow channel in the camera holder acting as a heat-transport fluid. By means of this stream of air or heat-transport fluid, the camera optics and the optical window are brought to the temperature of the heat-transport fluid or the stream of air from the air-conditioning system of the vehicle. Furthermore, it is advantageous that under extreme climatic conditions, the camera optics and camera electronics are thereby essentially brought slowly to the existing outside temperature because in this case they are also brought to the targeted temperature by the air-conditioning system or the ventilation system only after some length of time. Temperature changes that are too rapid, which could interfere with the functioning or service life of sensitive electrical and electronic components, are thereby avoided. Because air-conditioning systems are usually used at temperatures at which people feel comfortable and engineering equipment also functions without a problem in those temperature ranges, a simple temperature adjustment of the external camera device is attained in this way, and consequently the reliability of the camera increases without the camera system becoming overly expensive.

The thermal coupling of the camera optics and the camera electronics with the heat-transport fluid ensures that the camera optics and the camera electronics are brought to temperature independently of one another but yet at the same time. This has the advantage, compared to a camera system in which only the optics (for example an optical window) are heated, sprayed or radiated upon, that all of the components of the system, including the optics and the electronics, have essentially the identical temperature. By eliminating the temperature difference between the components, visual obstructions that are caused by condensation on the camera optics can be avoided, as can damage to the camera electronics caused by the effects of temperature or condensation.

The camera electronics are arranged in a portion of the flow channel that extends to the inside of the vehicle. The size of the temperature variation (dT) is thereby reduced, which improves the reliability.

The camera holder of the camera device that is mounted to the outside of a vehicle is divided into first and second holder parts. The first holder part is penetrated by the flow channel for the heat-transport fluid. The second holder part is hermetically sealed and contains the actual camera with the camera optics. The second holder part includes the optical window through which the camera optics record images, or the second holder part forms the camera optics themselves. By means of this division, both holder parts can be optimized independently of one another for their respective purposes.

Extremely dry air can be incorporated into the second holder part, so that the danger of condensation water forming is reduced. Direct heat transfer results from the edges of the first holder part to the second holder part and therewith to the camera optics and camera electronics. Heat transfer between the two holder parts and the desired temperature regulation is therewith improved.

Dividing the camera holder into two parts results through the heat-exchanger equipment itself. A closed and also visually attractive camera holder results. The heat-exchanger equipment thereby seals the second holder part airtight and water-tight against the flow channel in the first holder part and at the same time couples both of the holder parts thermally. To increase the efficiency of heat transfer, the heat-exchanger equipment exhibits a septum with heat-exchanger fins.

The inlet of the flow channel for the heat-transport fluid or the air-conditioned air is set from the inside of the vehicle on the mounting surface of the camera holder so that the inlet is not visible at the mounted external camera device and it can be compactly shaped.

The outlet from the flow channel for the heat-transport fluid is also disposed on the mounting surface of the camera holder, so that the air from the vehicle's air-conditioning system brought to temperature flows in through the inlet in the flow channel in the first holder part and is returned from the outlet into the vehicle again.

In an alternative embodiment, the outlet of the flow channel is not disposed on the mounting surface, but rather is below the optical window. In this way, the optical window can be brought to temperature from the outside by the air flowing out of the outlet, so that, for example, water drops, frost, and ice can be removed from the optical window in a simple manner. Dirt particles can also be prevented by this stream of air from remaining stuck to the optical window.

The outlet for the heat-transport fluid includes not just one but a plurality of outlet openings. One outlet opening can be disposed on the mounting surface while another is disposed below the optical window. Alternatively, one outlet opening can be disposed so that the fluid flow is against the side window of the vehicle, which is thereby defrosted while the second outlet opening causes the optical window to be brought to temperature from outside. Preferably fluid-guide or air-guide elements are used to direct the air flow from the outlet.

A vehicle with an external camera device according to the present invention can view at least one of the legally stipulated fields of view in Germany. It preferably involves field-of-view classes II and III (view of the principal outside mirror) and the field-of-view class IV (view of the wide-angle mirror).

The camera holder also extends out laterally transverse to the direction of the vehicle's travel. However, this camera holder or this camera arm is substantially smaller than a conventional outside mirror so that air resistance is considerably reduced compared to today's typical mirror systems.

The time needed for trucks to build up the necessary pressure in the brake cylinders can be used to bring the external camera device to the proper temperature. If necessary, the air can be pre-heated in a similar fashion to the heat-transport fluid by additional heating.

Figure 1:
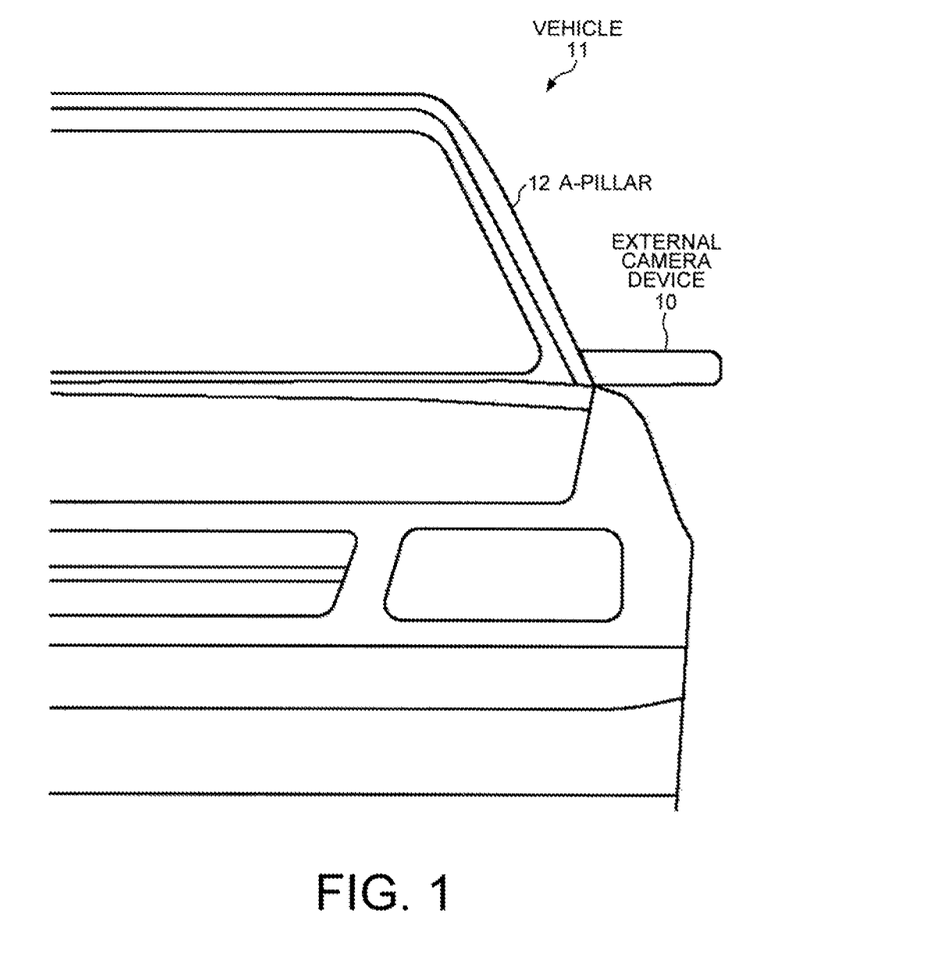
FIG. 1 shows an external camera device according to the present invention in the place of a conventional outside mirror on a vehicle.
Figure 2:
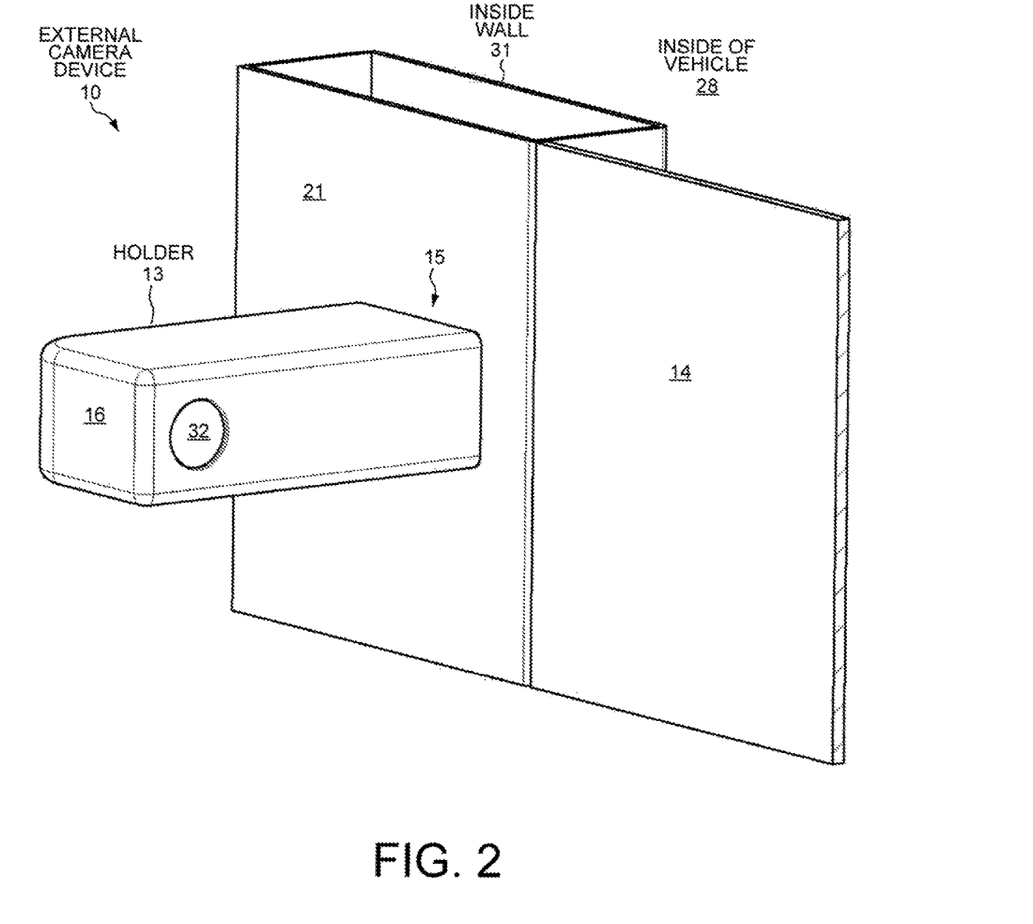
FIG. 2 is a perspective diagram of the external camera device of FIG. 1.

FIG. 1 shows a first embodiment of an external camera device 10 that is attached to the outside of a vehicle 11 in place of a conventional side mirror. The external camera device is placed like a conventional outside side mirror in the area of the A-pillar next to the side window. FIG. 2 shows the external camera device 10 in more detail. The external camera device 10 includes a one-piece, arm-shaped camera holder 13 that is placed in the area of A-pillar 12 adjacent a side window 14 of the vehicle 11. The camera holder 13 extends laterally out from the vehicle 11, transverse to the direction of travel. The camera holder 13 has a first end 15 facing the vehicle and a free second end 16 facing away from the vehicle 11.

Figure 3:
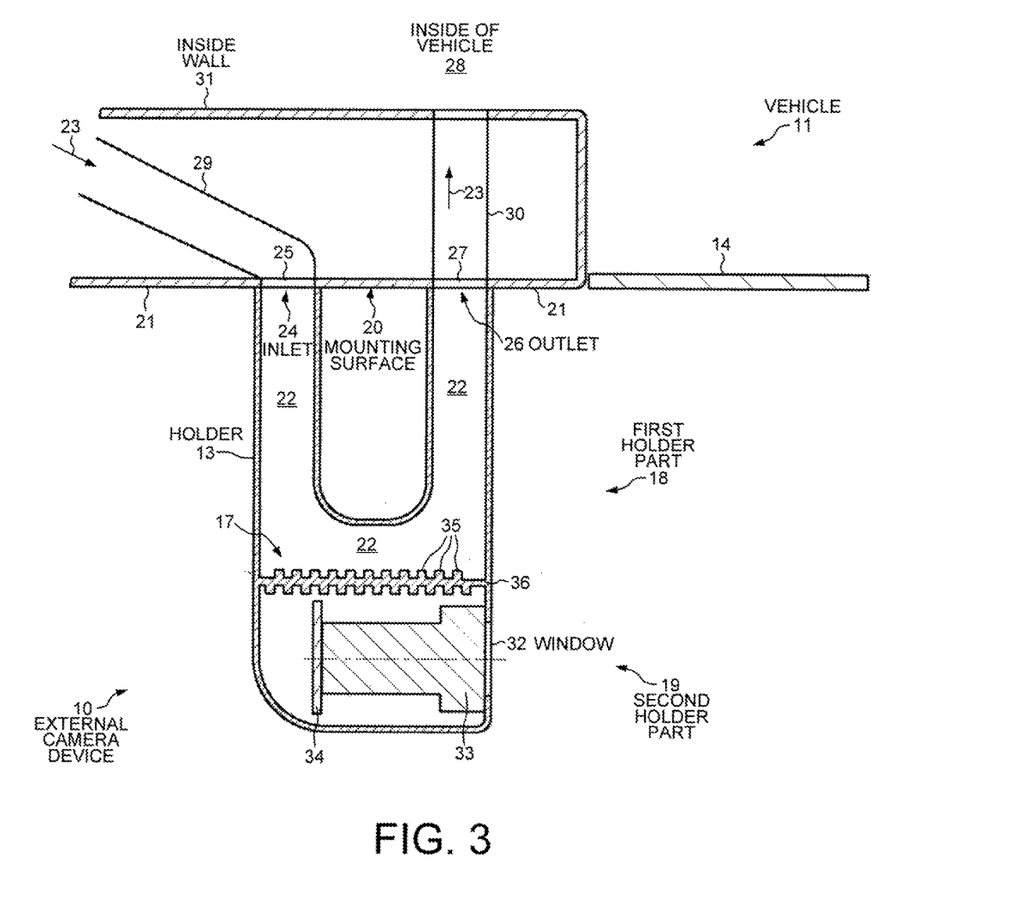
FIG. 3 is a cross-sectional diagram of a first embodiment of the external camera device of FIG. 1.

FIG. 3 is a cross-sectional view of external camera device 10 through a horizontal plane. FIG. 3 illustrates how the first embodiment of the external camera device 10 is mounted on the vehicle 11. The one-piece camera holder 13 is divided by heat-exchanger equipment 17 into a first holder part 18 and a second holder part 19. The first holder part 18 includes first end 15 that faces the vehicle 11, and the second holder part 19 has the free second end 16. A mounting surface 20 is constructed on the first end 15 of the camera holder 13 facing the vehicle and is attached to the outer side 21 of the vehicle 11.

The first holder part 18 is constructed as a flow channel 22 for a heat-transport fluid 23 in the form of air from the air-conditioning system of the vehicle 11. The flow channel 22 includes an inlet 24 with an inlet opening 25 and an outlet 26 with an outlet opening 27. Air from the air-conditioning system of the vehicle 11 flows through the inlet opening 25 and into the flow channel 22. Air is conducted from the flow channel 22, through the outlet opening 27 and back into the inside 28 of the vehicle 11. Both the inlet opening 25 and the outlet opening 27 are disposed on the mounting surface 20. The inlet opening 25 is aligned with and connected to an air-supply channel 29, which penetrates at least the outer surface 21 of the vehicle 11. The air-supply channel 29 branches off from an inlet opening (not shown) of the air-conditioning system on the inside 28 of the vehicle 11. The outlet opening 27 is aligned with and connected to a branch channel 30. Branch channel 30 penetrates both the outer surface 21 and an inside wall 31 of the vehicle 11 and consequently conducts the air from the flow channel 22 back into the inside 28 of the vehicle.

The second holder part 19 is hermetically sealed against the environment and includes an optical window 32 that points opposite the direction in which the vehicle is traveling. Camera optics 33 are disposed behind the optical window 32 in the second holder part 19. In addition, the second holder part 19 accommodates the associated camera electronics 34. The heat-exchanger equipment 17, which divides the camera holder 13 into the first and second holder parts, includes fins 35 and a partition 36 made of a material that conducts heat well, such as copper or aluminum. The heat-exchanger fins 35 extend perpendicular to the partition 36 and extend into both the first and the second holder parts 18 and 19. The heat-exchanger fins 35 allow the surface of the heat-exchanger equipment 17 to be increased in a known manner.

The air as the heat-transport medium 23 in the flow channel 22 is at room temperature due to the vehicle's air-conditioning system. Depending on the temperature conditions prevailing outside the vehicle 11, the heat-exchanger equipment 17 picks up heat from the stream of air 23 and heats the second holder part 19 with the camera optics 33 and camera electronics 34, as well as the optical window 32. Alternatively, the stream of air 23 picks up heat from the second holder part 19 through the heat-exchanger equipment 17 and cools it down to the room temperature of the inside 28 of the vehicle 11. In this way, the temperature-sensitive components 32-34 of the external camera device 10 are kept in a simple manner in non-critical temperature ranges without using special temperature regulation.

Figure 4:
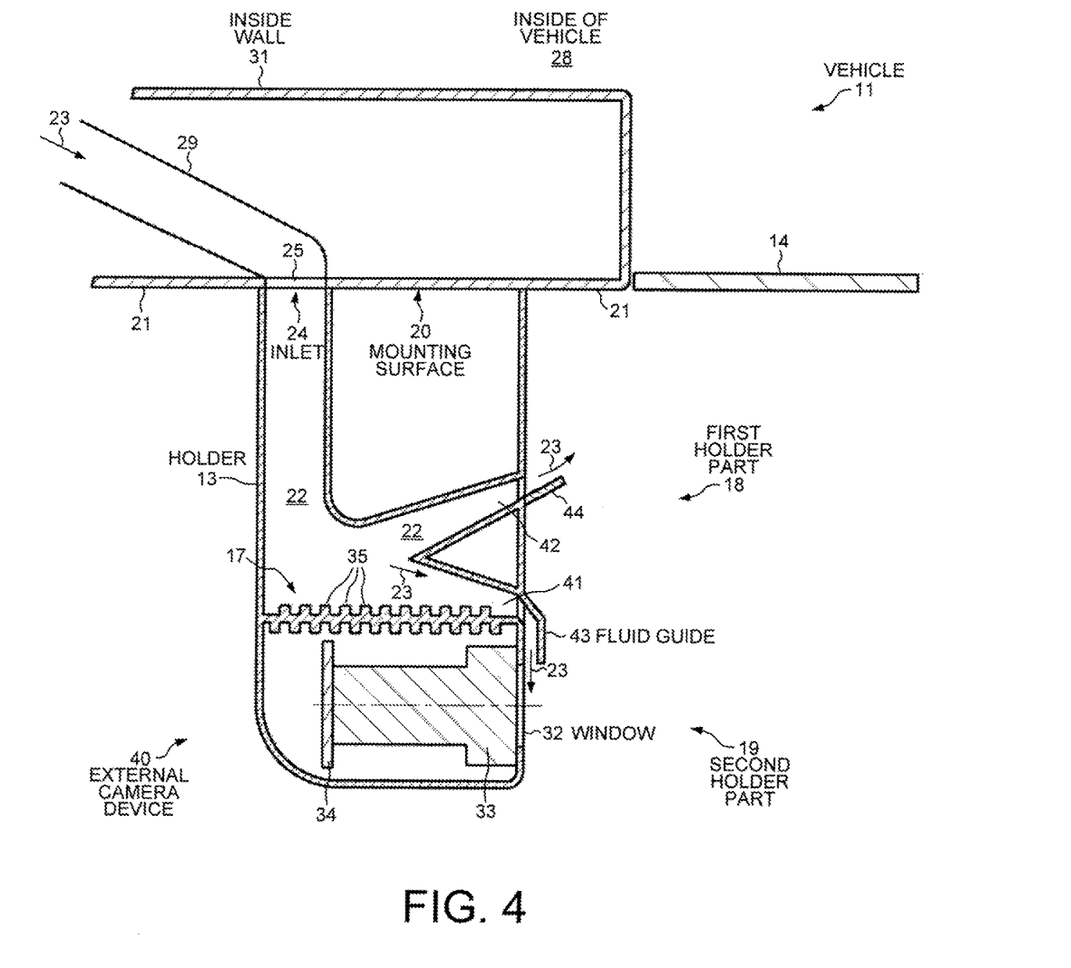
FIG. 4 is a cross-sectional diagram of a second embodiment of the external camera device of FIG. 1.

FIG. 4 shows a second embodiment of an external camera device 40, which is distinguished from the first embodiment of FIG. 3 in that no outlet leads back into the inside 28 of the vehicle 11. Instead, an outlet opens out into the area of the optical window 32. Furthermore, the outlet does not just have a single opening but instead has first and second outlet openings 41 and 42. The air flowing out of the first outlet opening 41 is conducted at least in part through a first fluid-guide element 43 to the outside of the optical window 32. The second outlet opening 42 is formed by directing the flow channel 22 within the first holder part 18 and by a second fluid-guide element 44 so that the stream of air 23 exiting from the second outlet opening 42 is conducted onto the outside of the side window 14. The optical window 32 on the one hand and the side window 14 on the other hand are defrosted by air from the two outlet openings 41-42. In addition, moisture and dirt are blown away by the stream of air. Because the stream of air 23 is not recycled back into the inside 28 of the vehicle 11, no changes for an inlet need to be made to the inside 28 of the vehicle 11.

Figure 5:
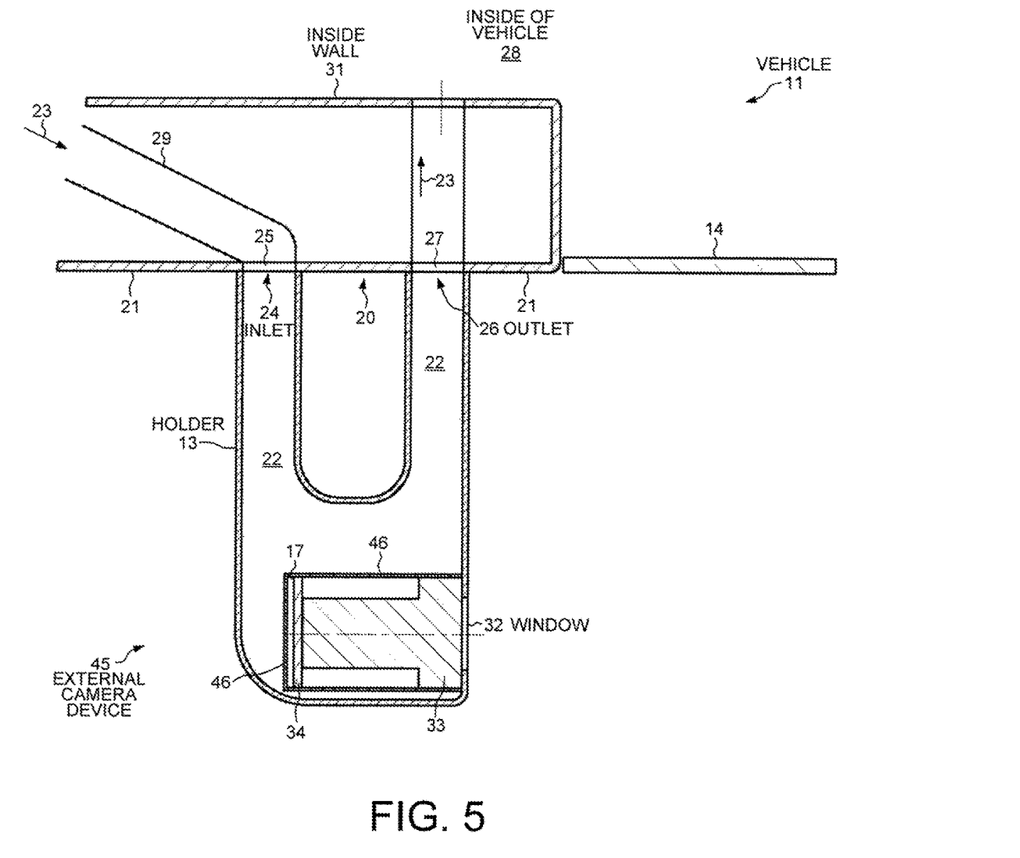
FIG. 5 is a cross-sectional diagram of a third embodiment of the external camera device of FIG. 1.

FIG. 5 shows a third embodiment of an external camera device 45, which is distinguished from the first embodiment of FIG. 3 in that the camera holder 13 is constructed as a single piece. In addition, the camera optics 33 and the camera electronics 34 are disposed in a casing 46 that includes the heat-exchanger equipment 17. The heat-transport fluid or the air-conditioned air 23 flows around the casing 46 on all sides but the side with the optical window 32. Consequently, the camera optics 33, the camera electronics 34 and the optical window 32 are brought to the temperature of the heat-transport fluid 23. The inlet 24 and outlet 26 correspond to the embodiment of FIG. 3, and the air stream 23 is recycled back into the inside 28 of the vehicle 11 in the same manner.

REFERENCE SIGN LIST

10 External camera device
11 Vehicle
12 A-pillar
13 Camera holder
14 Side window
15 First end of camera holder facing the vehicle
16 Second end of camera holder facing away from the vehicle (the free end)
17 Heat-exchanger equipment
18 First holder part
19 Second holder part
20 Mounting surface
21 Outer surface of vehicle
22 Flow channel
23 Heat-transport means (the air stream)
24 Inlet
25 Inlet opening
26 Outlet
27 Outlet opening
28 Inside of vehicle
29 Air-supply channel
30 Branch channel
31 Inside wall of vehicle
32 Optical window
33 Camera optics
34 Camera electronics
35 Heat-exchanger fins of heat-exchanger equipment
36 Partition of heat-exchanger equipment
40 External camera device
41 First outlet opening
42 Second outlet opening
43 First fluid-guide element
44 Second fluid-guide element
45 External camera device
46 Casing and heat-exchanger equipment Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A device comprising:
a camera holder attached to an outer surface of a motor vehicle;
camera optics disposed in the camera holder outside the motor vehicle;
an optical window in the camera holder disposed adjacent to the camera optics; and
a flow channel through the camera holder that guides an air stream, wherein the flow channel includes an inlet and an outlet, wherein the inlet of the flow channel is connected to a ventilation system inside the motor vehicle, and wherein the flow channel is thermally coupled to the camera optics.

2. The device of claim 1, further comprising:
camera electronics disposed inside the camera holder, wherein the flow channel is thermally coupled to the camera electronics.

3. The device of claim 1, further comprising:
camera electronics, wherein a portion of the flow channel is disposed inside the motor vehicle, and wherein the camera electronics are located in the portion of the flow channel portion disposed inside the motor vehicle.

4. The device of claim 1, wherein the camera holder includes a first holder part and a second holder part, wherein the inlet and the outlet of the flow channel are disposed in the first holder part, and wherein the camera optics and the optical window are disposed in the second holder part.

5. The device of claim 4, wherein the second holder part is airtight and water-tight.

6. The device of claim 4, wherein the first holder part is constructed as the flow channel.

7. The device of claim 4, wherein heat-exchanger equipment is disposed between the two holder parts, and wherein the heat-exchanger equipment thermally couples the second holder part to the first holder part.

8. The device of claim 7, wherein the camera holder is constructed in one piece and is divided by the heat-exchanger equipment into the first holder part and the second holder part.

9. The device of claim 7, wherein the heat-exchanger equipment is a partition with heat-exchanger fins.

10. The device of claim 1, wherein the camera holder includes a mounting surface upon which the device is mounted onto the outer surface of the motor vehicle, and wherein the inlet of the flow channel passes through the outer surface of the motor vehicle and through the mounting surface.

11. The device of claim 10, wherein the outlet of the flow channel passes through the mounting surface.

12. The device of claim 10, wherein the outlet of the flow channel is disposed adjacent to the optical window and conducts the air stream exiting the flow channel in part onto the outside of the optical window.

13. The device of claim 1, wherein the outlet of the flow channel includes a plurality of outlet openings.

14. The device of claim 1, wherein a fluid-guide element is disposed at the outlet of the flow channel.

15. The device of claim 14, wherein the fluid-guide element guides the air stream from the outlet towards the optical window.

16. The device of claim 1, wherein the camera holder includes a first end facing the outer surface of the motor vehicle and a second end pointing away from the motor vehicle, and wherein the optical window is oriented vertically in the camera holder between the first end and the second end.

17. The device of claim 1, wherein the ventilation system of the motor vehicle is an air-conditioning system.

18. A motor vehicle comprising:
a camera holder attached to an outer surface of the motor vehicle;
camera optics disposed in the camera holder;
an optical window in the camera holder disposed adjacent to the camera optics; and
a flow channel through the camera holder that guides an air stream, wherein the flow channel includes an inlet and an outlet, wherein the inlet of the flow channel is connected to a ventilation system of the motor vehicle, and wherein the flow channel is thermally coupled to the camera optics.

19. The motor vehicle of claim 18, wherein the camera holder extends out laterally away from the motor vehicle from a location adjacent to an A-pillar of the motor vehicle.

20. The motor vehicle of claim 18, wherein the outlet of the flow channel is connected to the ventilation system of the motor vehicle.

21. The motor vehicle of claim 18, wherein a fluid-guide element guides the air stream from the outlet of the flow channel towards the optical window.

22. The motor vehicle of claim 18, wherein a fluid-guide element guides the air stream from the outlet of the flow channel towards a side window of the motor vehicle.

* * * * *